US010687585B2

(12) United States Patent
Shi et al.

(10) Patent No.: US 10,687,585 B2
(45) Date of Patent: Jun. 23, 2020

(54) ADJUSTABLE SHOE AND METHOD FOR ADJUSTING A SHOE

(71) Applicant: Cornell University, Ithaca, NY (US)

(72) Inventors: Mengyun Shi, Ithaca, NY (US); John Stager, Trumansburg, NY (US); Thomas Tapen, Springfield, VA (US); Tianshu Liu, Ithaca, NY (US); Huiju Park, Ithaca, NY (US); Charles V. Beach, Jr., Watkins Glen, NY (US)

(73) Assignee: Cornell University, Ithaca, NY (US)

( * ) Notice: Subject to any disclaimer, the term of this patent is extended or adjusted under 35 U.S.C. 154(b) by 22 days.

(21) Appl. No.: 15/566,442

(22) PCT Filed: Apr. 15, 2016

(86) PCT No.: PCT/US2016/027991
§ 371 (c)(1),
(2) Date: Oct. 13, 2017

(87) PCT Pub. No.: WO2016/168767
PCT Pub. Date: Oct. 20, 2016

(65) Prior Publication Data
US 2018/0140048 A1     May 24, 2018

Related U.S. Application Data

(60) Provisional application No. 62/147,846, filed on Apr. 15, 2015.

(51) Int. Cl.
*A43B 21/42*     (2006.01)
*A43B 3/00*     (2006.01)
(Continued)

(52) U.S. Cl.
CPC ............ *A43B 21/42* (2013.01); *A43B 3/0005* (2013.01); *A43B 3/246* (2013.01); *A43B 7/141* (2013.01);
(Continued)

(58) Field of Classification Search
CPC ....... A43B 21/42; A43B 21/36; A43B 3/0005; A43B 3/0015; A43B 3/246; A43B 13/14; A43B 13/16; A43B 7/38
See application file for complete search history.

(56) References Cited

U.S. PATENT DOCUMENTS 4,941,271 A * 7/1990 Lakic ............... A41D 19/01535
36/117.1
7,631,382 B2    12/2009 DiBenedetto et al.
(Continued)

FOREIGN PATENT DOCUMENTS

CN          2419856 Y     2/2001
DE    102011108131 A1     1/2013
(Continued)

*Primary Examiner* — Ted Kavanaugh
(74) *Attorney, Agent, or Firm* — Hodgson Russ LLP

(57) ABSTRACT

An adjustable shoe includes an outsole having a middle portion hingedly attached to a forefoot portion and a heel portion. A segmented driveshaft spans from the forefoot portion of the outsole to the heel portion. Rotation of a front segment of the driveshaft causes the forefoot portion of the outsole to rotate about a hinge axis thereby adjusting a forefoot angle. A first motor is connected to the driveshaft and operable to rotate the driveshaft. A processor is in communication with the first motor and programmed to operate the first motor to provide adjustment to the shoe. A method of adjusting a shoe includes receiving a signal representing a measured force on a portion of an outsole of the shoe. If the measured force exceeds a pre-determined
(Continued)

threshold, a motor is activated to change an angle of a forefoot portion of the outsole relative to a middle portion.

11 Claims, 14 Drawing Sheets

(51) Int. Cl.
    *A43B 3/24*     (2006.01)
    *A43B 13/16*     (2006.01)
    *A43B 13/14*     (2006.01)
    *A43B 7/14*     (2006.01)
    *A43B 21/36*     (2006.01)
    *A43B 7/38*     (2006.01)
    *H02J 7/00*     (2006.01)

(52) U.S. Cl.
    CPC .............. *A43B 7/1455* (2013.01); *A43B 7/38* (2013.01); *A43B 13/14* (2013.01); *A43B 13/16* (2013.01); *A43B 21/36* (2013.01); *H02J 7/0052* (2013.01); *H02J 2007/0062* (2013.01)

(56) References Cited

U.S. PATENT DOCUMENTS

| | | |
|---|---|---|
| 2004/0064974 A1 | 4/2004 | Shuster |
| 2012/0055048 A1* | 3/2012 | Haupt ...................... A43B 3/24 |
| | | 36/34 R |
| 2013/0340287 A1 | 12/2013 | Stewart |
| 2015/0157087 A1* | 6/2015 | Blumenthal ........... A43B 21/42 |
| | | 36/100 |
| 2015/0201704 A1* | 7/2015 | Huber .................... A43B 3/246 |
| | | 36/25 R |
| 2017/0213095 A1* | 7/2017 | Li ......................... A43B 3/0021 |
| 2017/0265573 A1* | 9/2017 | Beers ................... A43B 3/0005 |
| 2017/0340051 A1* | 11/2017 | Rogers ................. A43B 3/0005 |
| 2018/0140048 A1* | 5/2018 | Shi ......................... A43B 13/14 |

FOREIGN PATENT DOCUMENTS

| | | |
|---|---|---|
| DE | 202014002253 U1 | 4/2014 |
| EP | 1952715 A1 | 8/2008 |

* cited by examiner

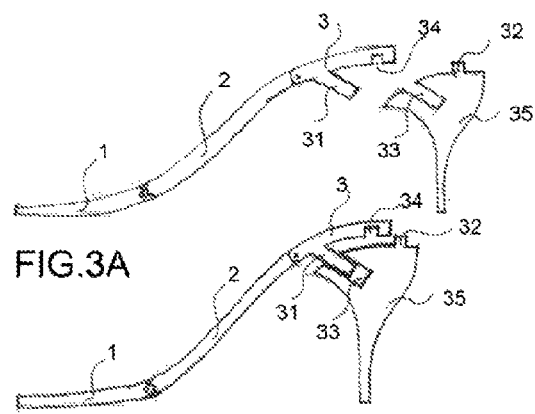
FIG.3A
FIG.3B
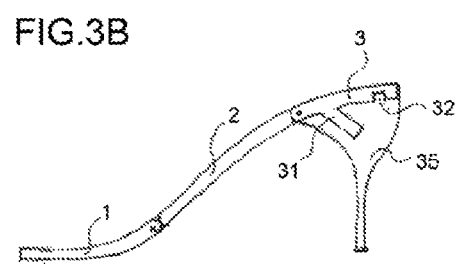
FIG.3C
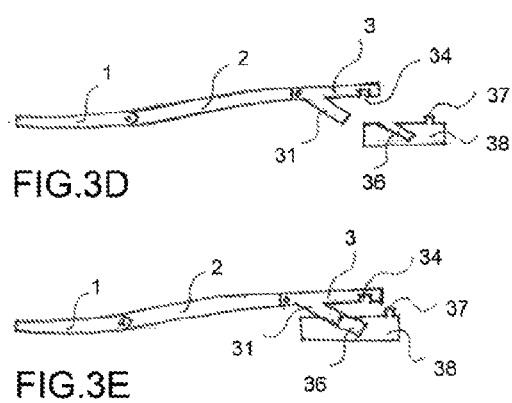
FIG.3D
FIG.3E
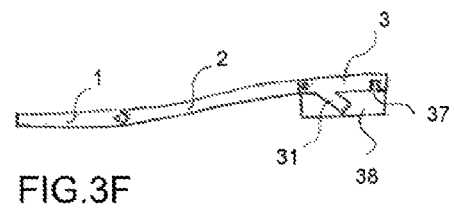
FIG.3F

ADJUSTABLE SHOE AND METHOD FOR ADJUSTING A SHOE

CROSS-REFERENCE TO RELATED APPLICATIONS

This application claims priority to U.S. Provisional Application No. 62/147,846, filed on Apr. 15, 2015, now pending, the disclosure of which is incorporated herein by reference.

FIELD OF THE DISCLOSURE

The present disclosure relates to shoes, and more particularly to shoes having adjustable heels and/or sole contours.

BACKGROUND OF THE DISCLOSURE

Foot pain by wearing high heels is a common problem among women. New York Times reports that about 75% of people in the United States have foot pain, which a large portion can be attributed to women wearing high heel shoes. High heel shoes are known to cause pain, in particular to the balls of user's feet.

According to statisticbrain.com, women's dress shoes occupy 35% of the overall women's shoes market. This ranks dress shoes as the number two category of women's shoes (women's casual shoes is ranked first, occupying 42.5% of the market).

BRIEF SUMMARY OF THE DISCLOSURE

The present application can include an automatic heel height adjustment system to help women solve this serious problem. The application can be embodied as a shoe having an automatic heel height adjustment system. The shoe can include rotatable outsole portions and a removable heel to allow the state of the shoe to switch between, for example, a flat shoe and a high heel automatically in few seconds. Embodiments of the application can help relieve foot pain by changing the state of the shoe according to the wearer's needs.

In some embodiments, the outsole can be rotatable. For example, portions of the outsole may rotate relative to other outsole portions. A sensor can be used to signal a change in the state of the shoe. In one particular example, a pressure sensor can be located on the shoe such that the state of the outsole can be changed in response to signals from the sensor. The state may be changeable in seconds, or as little as one second or less.

The shoe can have a modular, interchangeable design. This can be embodied by a removable heel that allows for quick adjustment of the height of the heel.

The shoe may also have an internal battery that is charged by a standard connection port. For instance, the shoe can be connected to a USB charging device to charge the internal battery using electronic devices, such as a laptop or other portable computer appliance. In this manner, the shoe can have an internal battery that is readily chargeable.

DESCRIPTION OF THE DRAWINGS

For a fuller understanding of the nature and objects of the disclosure, reference should be made to the following detailed description taken in conjunction with the accompanying drawings, in which:

FIG. 3A a side elevation view of a shoe according to another embodiment of the present disclosure, showing a removable heel disconnected from a heel portion of the outsole, and wherein the outsole is in a high heel state and the removable heel is a high heel;

FIG. 3B is a side elevation view of the shoe of FIG. 3A showing the removable heel partially connected to the heel portion of the outsole;

FIG. 3C is a side elevation view of the shoe of FIGS. 3A and 3C showing the removable heel connected to the heel portion of the outsole;

FIG. 3D a side elevation view of a shoe according to another embodiment of the present disclosure, showing a removable heel disconnected from a heel portion of the outsole, and wherein the outsole is in a low heel state and the removable heel is a low heel;

FIG. 3E is a side elevation view of the shoe of FIG. 3D showing the removable heel partially connected to the heel portion of the outsole;

FIG. 3F is a side elevation view of the shoe of FIGS. 3D and 3E showing the removable heel connected to the heel portion of the outsole;

DETAILED DESCRIPTION OF THE DISCLOSURE

Figure 1A:
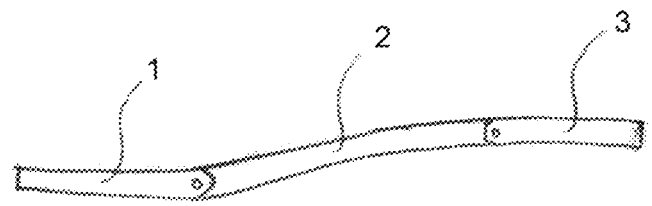
FIG. 1A is a side elevation view of an outsole according to an embodiment of the present disclosure.
Figure 1B:
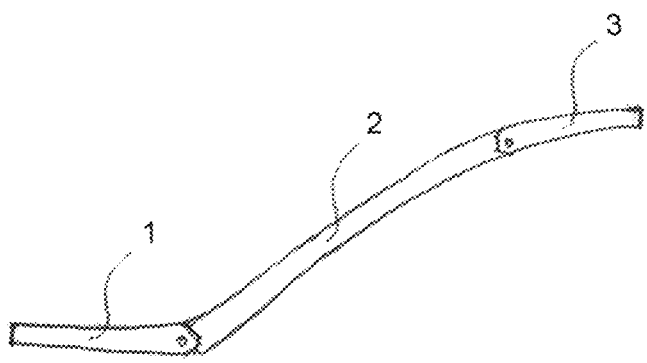
FIG. 1B is a side elevation view of the outsole of FIG. 1A, wherein the outsole is in a high heel state.
Figure 1C:
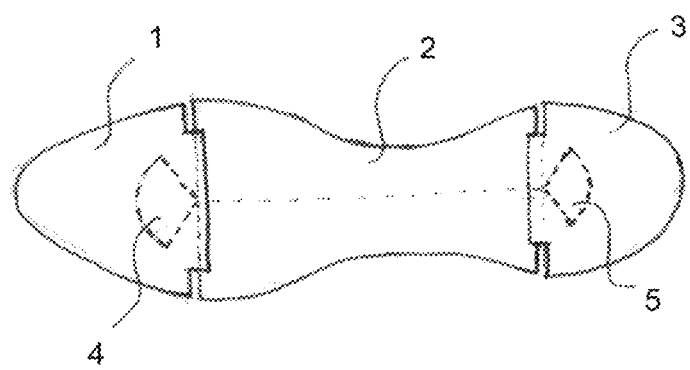
FIG. 1C is a top view of the outsole of FIGS. 1A and 1B.

With reference to FIG. 1A-1C, the present disclosure may be embodied as an adjustable shoe having an outsole 10. The outsole 10 has a middle portion 2, which is hingedly attached to a forefoot portion 1 at a forefoot angle. The middle portion 2 of the outsole 10 is also hingedly attached to a heel portion 3 at a heel angle. FIG. 1A depicts the outsole 10 configured in a low-heel state (e.g., a flat shoe configuration). FIG. 1B depicts the outsole 10 configured in a high-heel state.

By hingedly attached, it should be noted that the outsole portions may be attached to one another using a traditional hinge with a hinge pin or the outsole portions may be attached using another hinge configuration. For example, the outsole portions may be continuous so as to form an integrated outsole, with the forefoot, middle, and heel portions attached to one another by a flexible connection thereby being rotatable with respect to each other (i.e., hingedly attached). Other techniques for hingedly attaching the outsole portions will be apparent to one having skill in the art in light of the present disclosure.

In some embodiments, for example, the embodiment depicted in FIGS. 8A-8C and 9, each outsole portion are made in two halves. This is most readily seen in FIG. 9, wherein the forefoot portion is made up of a forefoot top 110 and a forefoot bottom 111, the middle portion is made up of a middle top 112 and middle bottom 113, and the heel portion is made up of a heel top 114 and a heel bottom 115. In this way, recesses may be created for insertion of other shoe components further described below.

Figure 2A:
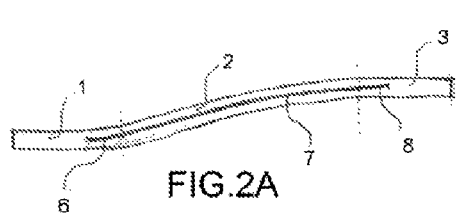
FIG. 2A is a side elevation view of an outsole according to another embodiment of the present disclosure, wherein the outsole is in a low heel state.

The shoe further comprises a driveshaft 7 disposed within the outsole 10 (see, for example, FIG. 2A). The driveshaft 7 spans from the forefoot portion 1, through the middle portion 2, and to the heel portion 3. The driveshaft 7 is made up from a number of segments—i.e., the driveshaft is "segmented." Segments of the driveshaft 7 may be joined to one another by gears or other joint configurations. A front segment 6 of the driveshaft 7 is disposed in a forefoot recess 4 and a rear segment 8 of the driveshaft 7 is disposed in a heel recess 5. The driveshaft 7 is able to rotate about a primary longitudinal axis.

Figure 2B:
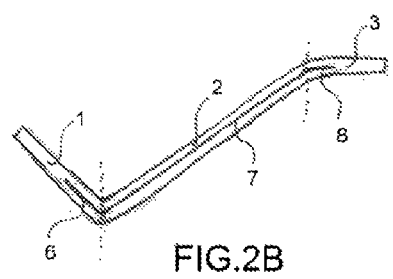
FIG. 2B is a side elevation view of the outsole of FIG. 2A, wherein the outsole is in a high heel state.
Figure 2C:
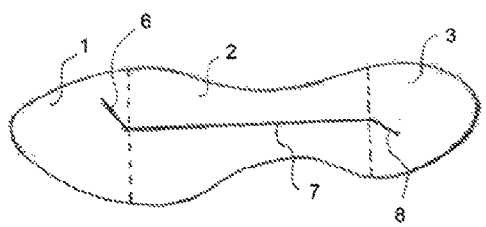
FIG. 2C is a top view of the outsole of FIG. 2A.
Figure 2D:
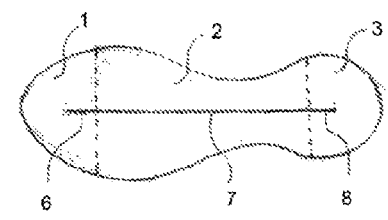
FIG. 2D is a top view of the outsole of FIG. 2B.
Figure 2E:
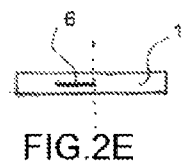
FIG. 2E is a rear view of the outsole of FIGS. 2A and 2C.
Figure 2F:
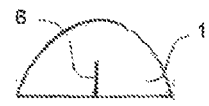
FIG. 2F is a rear view of the outsole of FIGS. 2B and 2D.

The driveshaft 7 is configured such that rotation of the front segment 6 of the driveshaft 7 causes the forefoot portion 1 of the outsole 10 to rotate about the hinge axis. In this way, the forefoot angle is changed (i.e., the angle of the forefoot portion 1 is changed relative to the middle portion 2). The driveshaft 7 may be further configured such that rotation of the rear segment 8 of the driveshaft 7 causes the heel portion 3 of the outsole 10 to rotate about the hinge axis. In this way, the heel angle is changed (i.e., the angle of the heel portion 3 is changed relative to the middle portion 2). For example, in FIGS. 2A-2F, it can be seen that the front segment 6 of the driveshaft 7 is angled such that rotation about the longitudinal axis from 0° to 90° (from the position in FIG. 2E to the position of FIG. 2F) will cause the front segment 6 to urge the forefoot portion 1 to rotate relative to the middle portion 2. In this way, the forefoot angle is changed from a flat configuration shown in FIG. 2A to a high heel configuration shown in FIG. 2B. Similarly, rotation of the rear segment 8 will urge rotation of the heel portion 3 (see, e.g., the change from FIG. 2C to FIG. 2D). Where the segments of the driveshaft 7 are interconnected by gears, the gear ratio between segments can be configured such that rotation of the driveshaft will change the forefoot angle at a rate of change which is different from a rate of change of the heel angle.

Figures 4A, 4B, 4C:
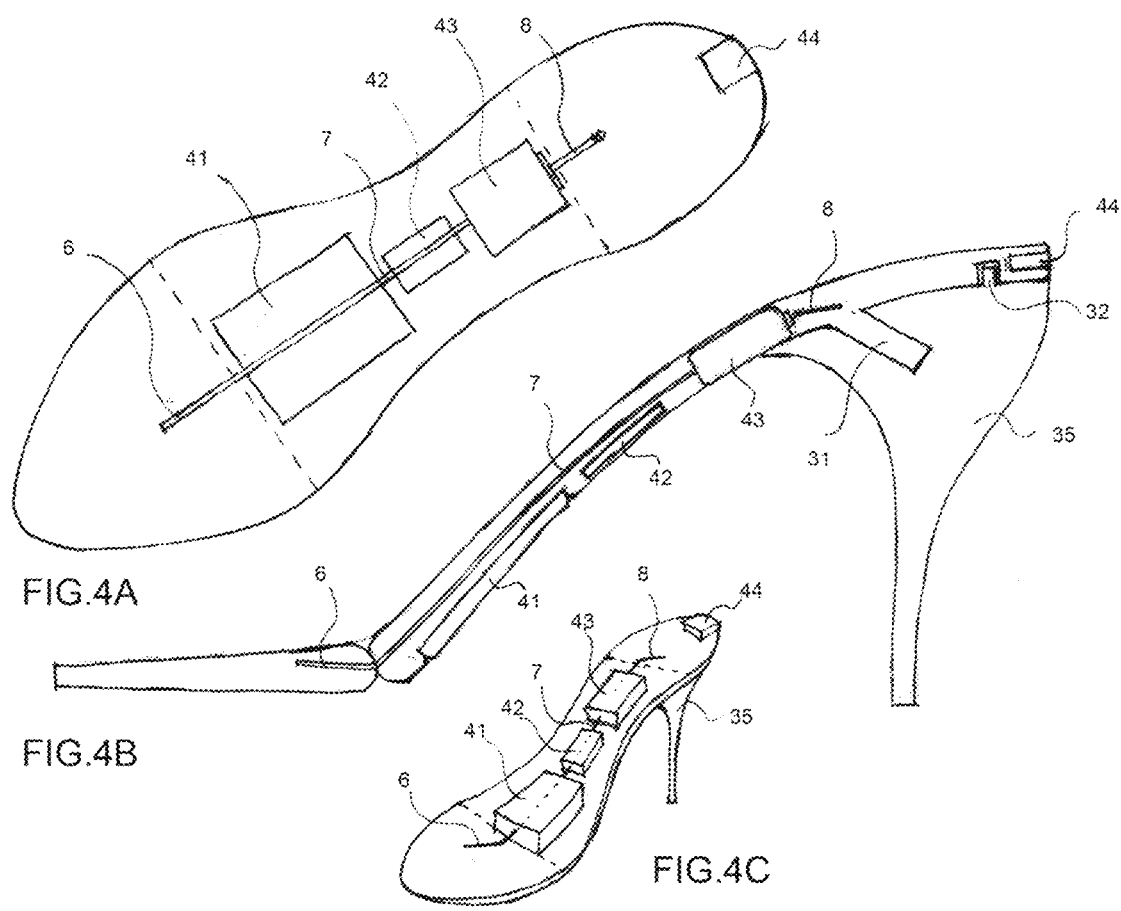
FIG. 4A is a top view of a shoe according to another embodiment of the present disclosure.
FIG. 4B is a side elevation view of the shoe of FIG. 4A.
FIG. 4C is an orthogonal view of the shoe of FIGS. 4A and 4B.
Figure 5A:
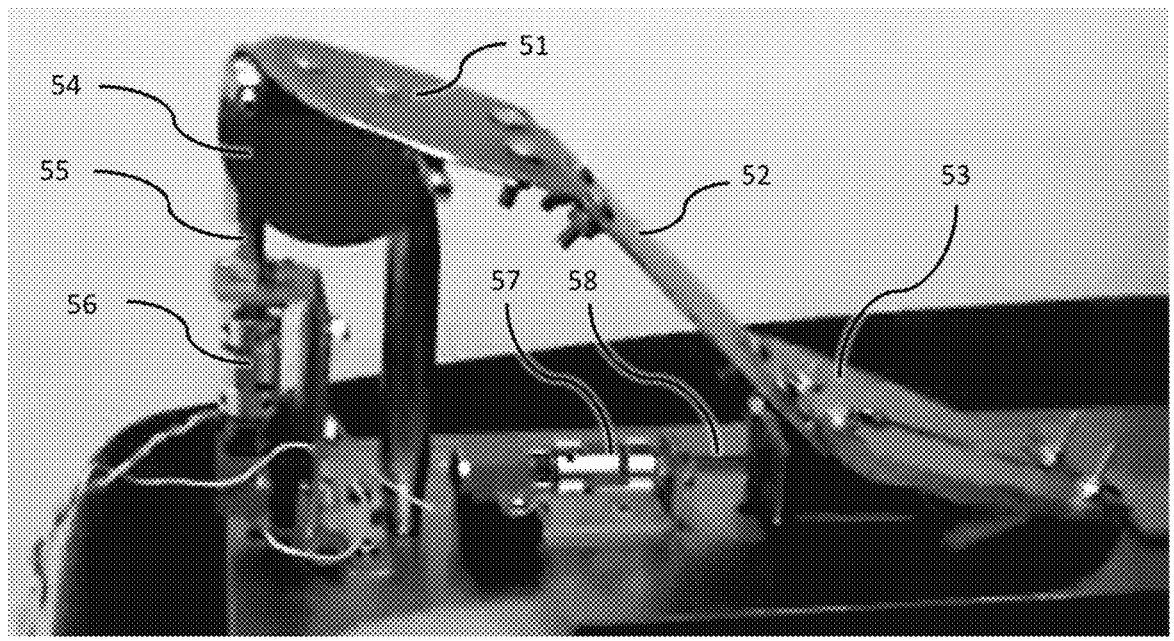
FIG. 5A is an orthogonal view of a prototype shoe according to another embodiment of the present disclosure.
Figure 5B:
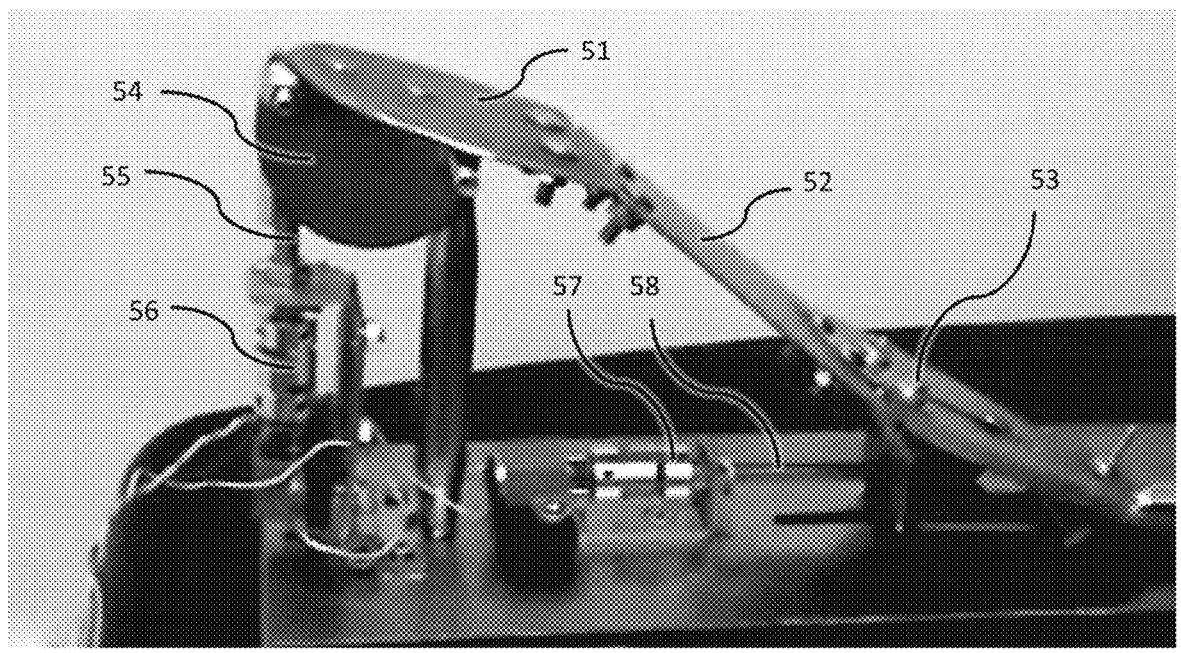
FIG. 5B is an orthogonal view of the prototype shoe of FIG. 5A.
Figure 5C:
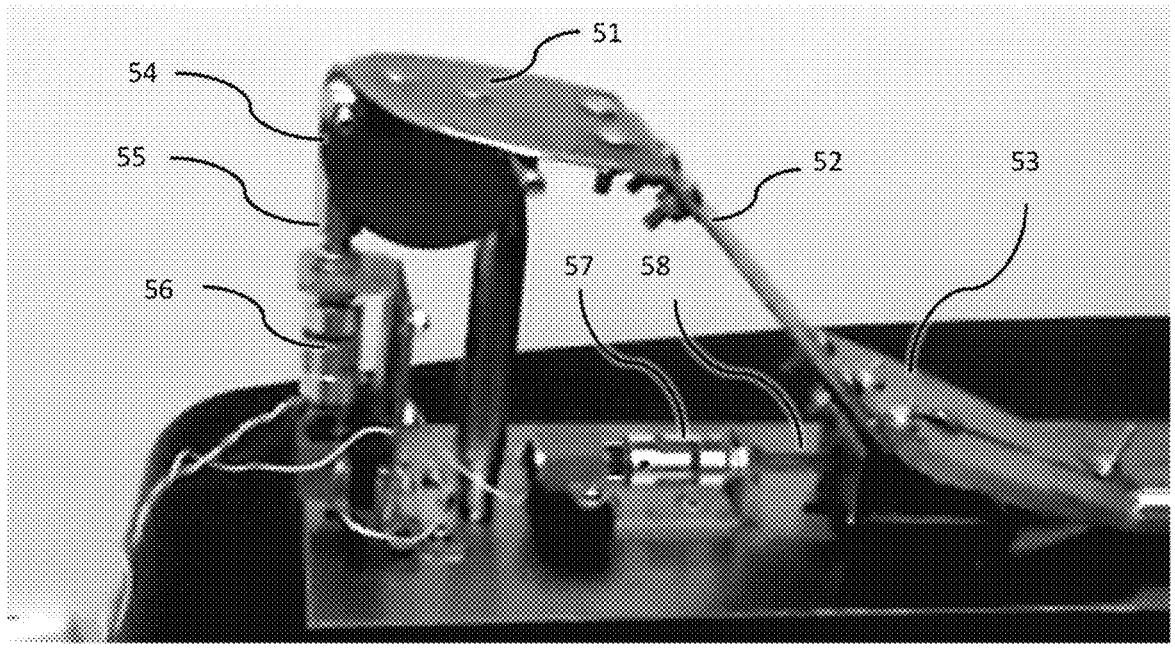
FIG. 5C is an orthogonal view of the prototype shoe of FIGS. 5A and 5B.
Figure 5D:
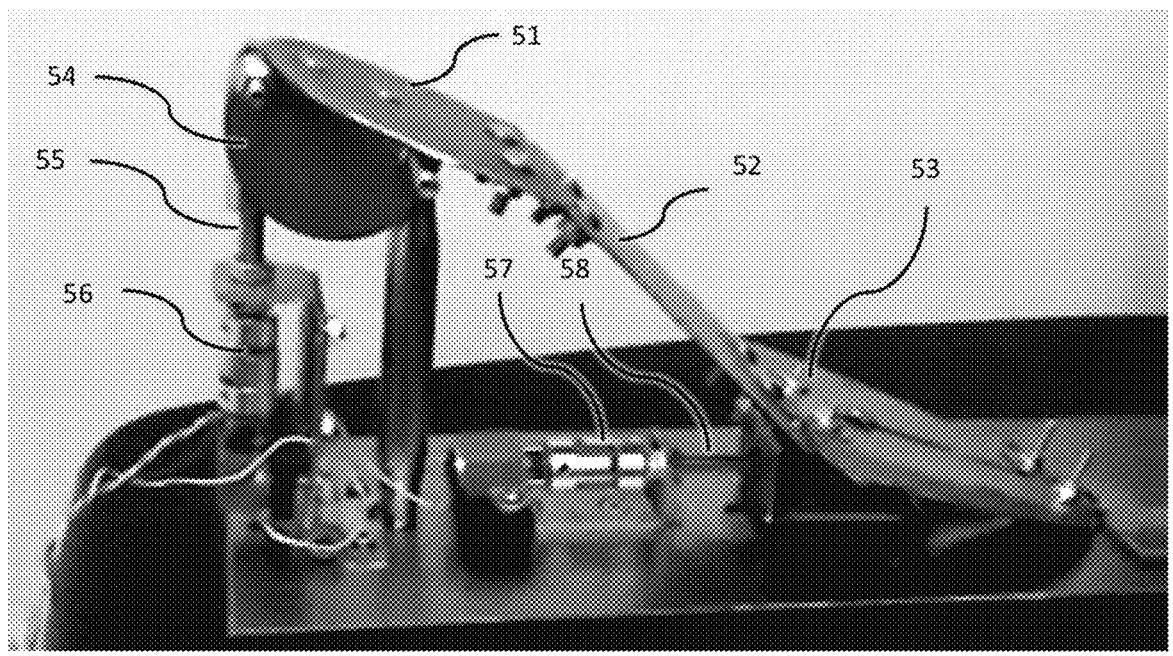
FIG. 5D is an orthogonal view of the prototype shoe of FIGS. 5A-5C.

With reference to FIGS. 4A-4C, the shoe 20 further comprises a first motor 43 in mechanical communication with the driveshaft 7, the first motor 43 operable to rotate the driveshaft 7. The first motor 43 could be any type of motor, including, for example, an electric motor. The first motor 43 is operably connected to the driveshaft 7. For example, the first motor 43 may be configured to provide a torque to the driveshaft 7, so as to rotate the driveshaft 7. The first motor 43 and driveshaft 7 may be directly connected to each other or indirectly connected. For example, in the first motor 43 may be in mechanical communication with the driveshaft 7 by way of a transmission comprising a plurality of gears. For example, in a particular embodiment built as a prototype, seven gears were used for transferring mechanical power to the forefoot portion 1 and the heel portion 3 to rotate the outsole portions.

In another embodiment, the shoe further comprises a second motor in electronic communication with the processor. The second motor is operably connected to a second driveshaft. In such an embodiment, the first motor and driveshaft can provide adjustment for the forefoot angle, and the second motor and second driveshaft provides adjustment for the heel angle. As such, the second driveshaft can be configured such that rotation of the second driveshaft causes the heel portion of the outsole to rotate about the hinge axis. In this way, the heel angle is changed by the second driveshaft (as operated by the second motor).

In embodiments using an electric motor 43, the first motor 43 is connected to a battery. In embodiments having more than one motor, each motor can be connected to the same battery, or one or more of the motors may be connected to separate batteries. The battery may be external or the motor 43 may be connected to an internal battery 41. The shoe may further comprise a charging circuit. The charging circuit may be configured to be connected to a power supply by an electrical connection such as, for example, a USB connection.

The shoe further comprises a processor 42 in communication with the motor 43. The processor 42 may be a microcontroller or another suitable processor. The processor 42 is programmed to operate the motor to provide adjustment to the shoe.

The adjustable shoe may further comprise a heel configured to be removably attached to the heel portion 3 of the outsole 10. The heel may be configured to have any height.

For example, the heel may be configured as a high heel 35, such as that depicted in FIGS. 3A-3C. In another embodiment, the heel may be configured as a low heel 38 such as that depicted in FIGS. 3D-3F. The heel may comprise a coupler configured to be attached to a mating coupler of the heel portion of the outsole. For example, FIGS. 3A-3C show the high heel 35 being attached to the heel portion 3 by way of couplers 32, 33 and mating couplers 34, 31. In the embodiment depicted in FIGS. 3D-3F, the same mating couplers 34, 31 of the heel portion 3 are attached to corresponding couplers 37, 36 of the low heel 38.

The adjustable shoe may further comprise a first sensor 44 configured to measure a force applied to an area of the outsole 10. For example, the first sensor 44 may be located in the heel portion 3 of the outsole 10 and configured to measure a force applied to at least a portion of the heel portion 3. Such an applied force may be cause by the weight of the wearer. The first sensor 44 is in communication with the processor 43. In this way, the first sensor 44 may provide a signal to the processor 43 indicating the measured force, and the processor 43 may respond accordingly. For example, if the measured force exceeds a pre-determined threshold, the processor 43 may adjust the forefoot angle and the heel angle to decrease the force measured by the first sensor 44.

Similarly, additional sensors may measure forces applied to other portions of the outsole. For example, a second sensor may be located in the forefoot portion 1 of the outsole 10 and configured to measure a force applied to at least a portion of the forefoot portion 1. In this way, the forces measured by the first and second sensors (and any additional sensors) may be used to determine a distribution of the forces (i.e., the distribution of the wearer's weight) across the outsole 10.

In another embodiment, a manually actuated sensor may be provided. For example, the shoe may comprise a switch that can be manually actuated by the wearer to adjust the shoe as desired.

Figure 6A:
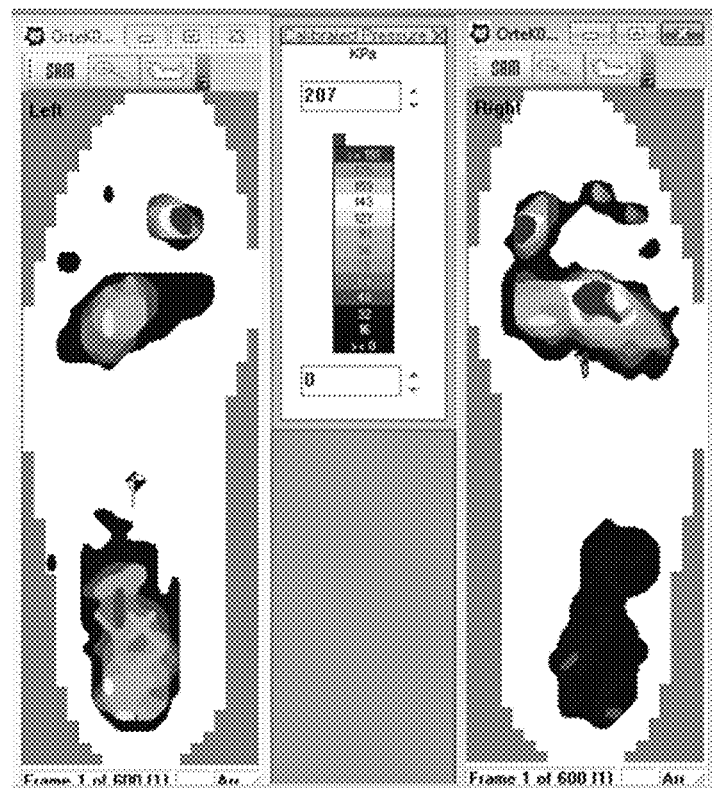
FIG. 6A is an illustration of foot pressure data of a subject wearing a traditional high-heel shoe.
Figure 6B:
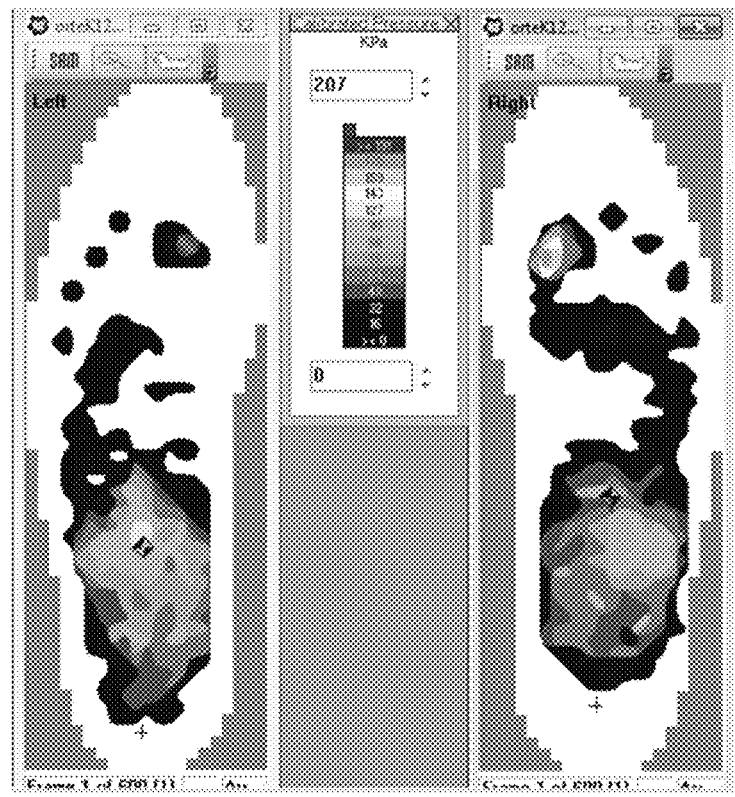
FIG. 6B is an illustration of foot pressure data of a subject wearing shoes of an embodiment of the present disclosure.
Figure 7A:
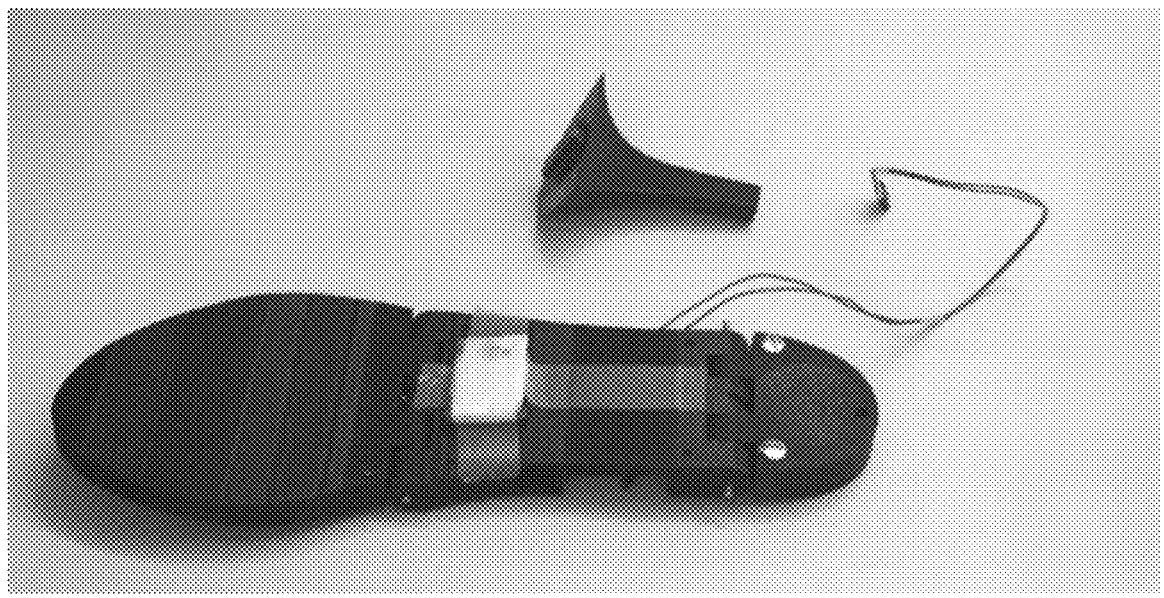
FIG. 7A is a side orthogonal view of a shoe according to another embodiment of the present disclosure, showing the heel detached from the outsole.
Figure 7B:
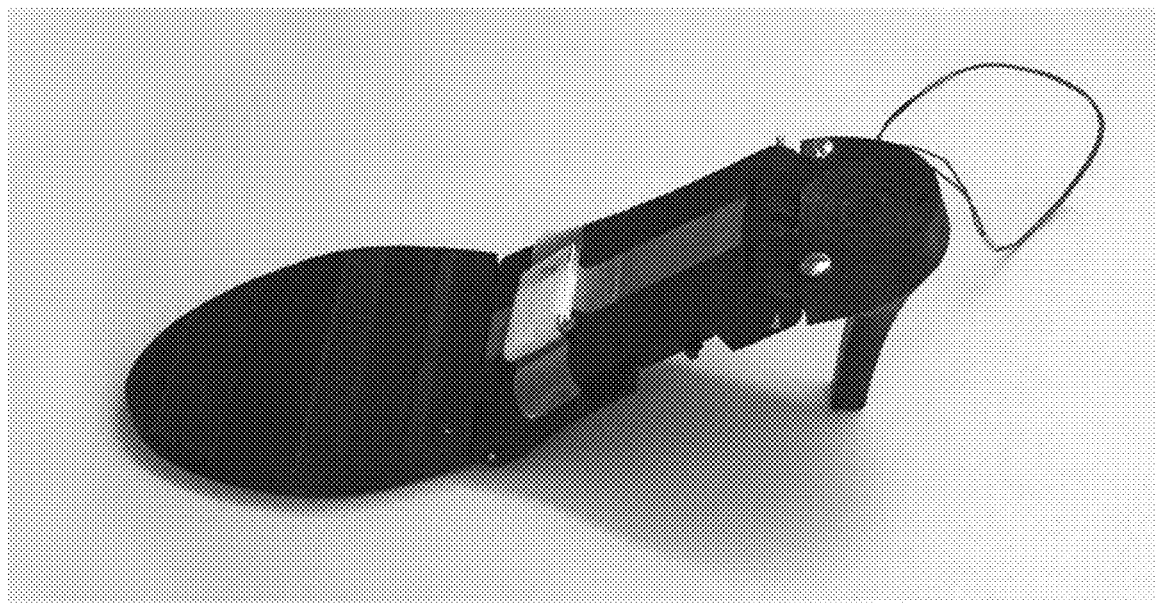
FIG. 7B is a side orthogonal view of the shoe of FIG. 7A, showing the heel attached to the outsole.
Figure 7C:
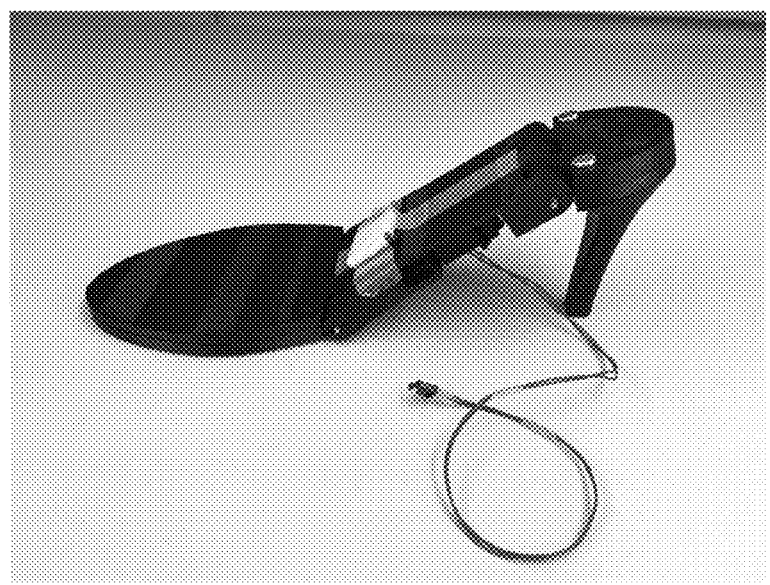
FIG. 7C is a side orthogonal view of the shoe of FIGS. 7A and 7B, showing the heel attached to the outsole.
Figure 7D:
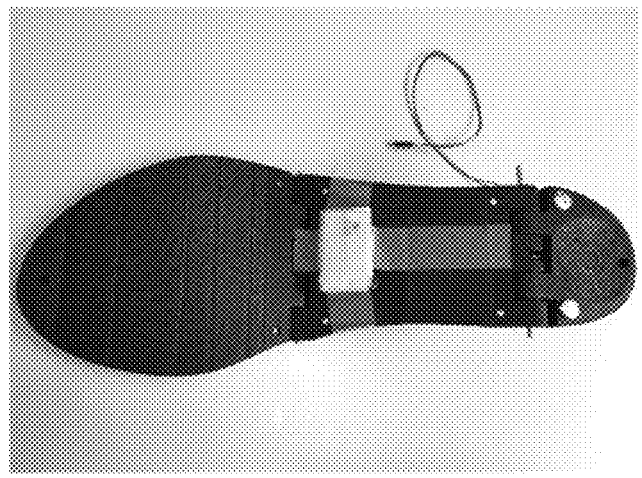
FIG. 7D is a top view of the shoe of FIGS. 7A-7C.
Figure 7E:
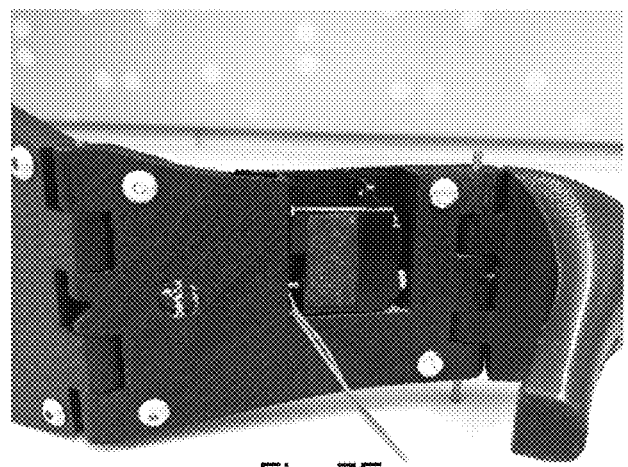
FIG. 7E is a bottom orthogonal view of a portion of the shoe of FIGS. 7A-7D.
Figure 8A:
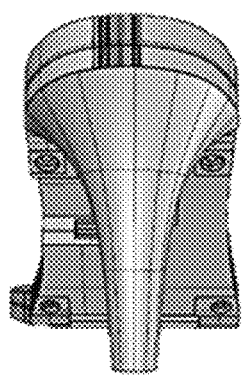
FIG. 8A is a rear view of a shoe according to another embodiment of the present disclosure.
Figure 8B:
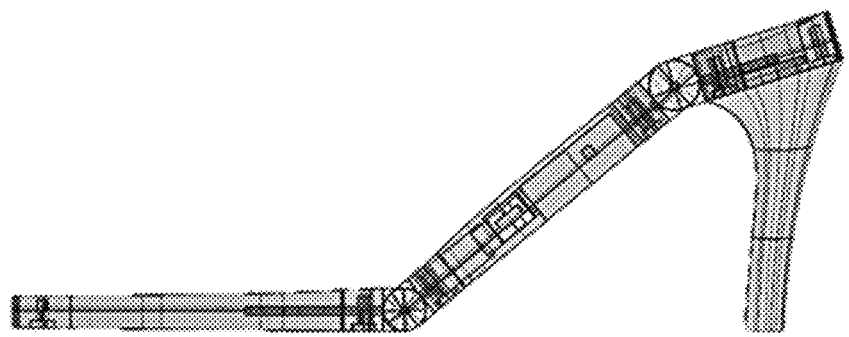
FIG. 8B is a side elevation view of the shoe of FIG. 8A.
Figure 8C:
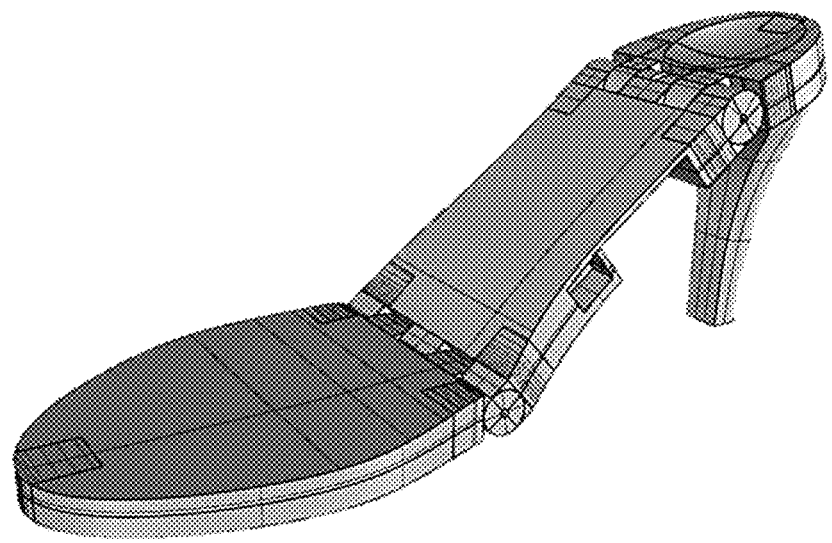
FIG. 8C is a perspective view of the shoe of FIGS. 8A and 8B.
Figure 9:
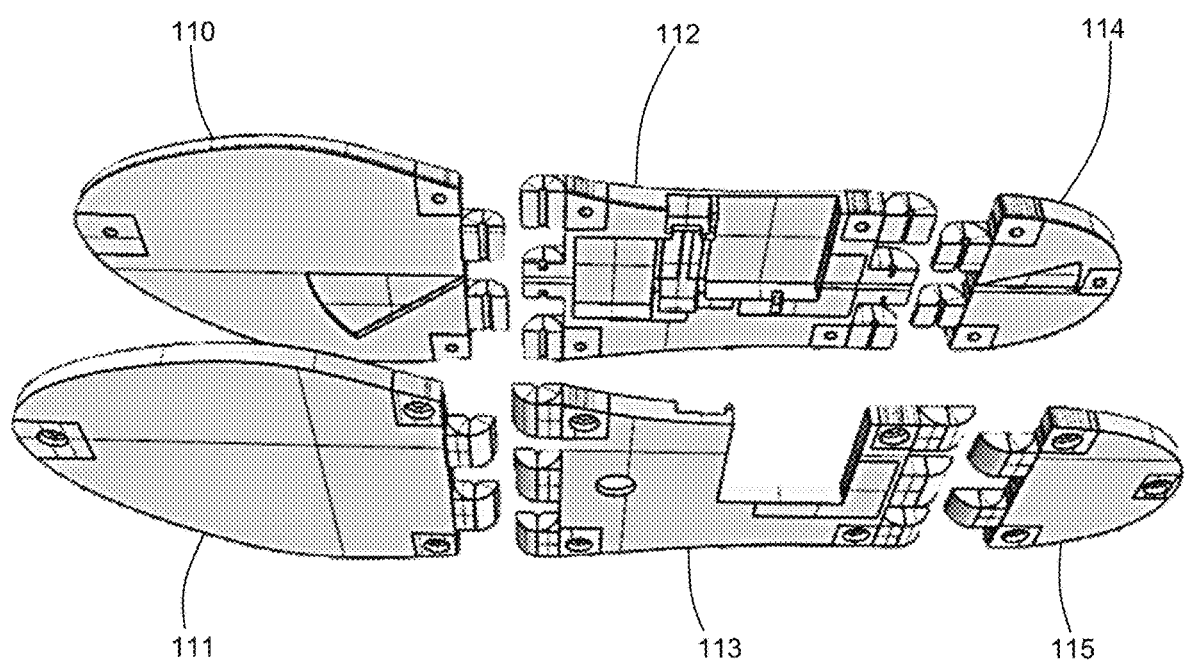
FIG. 9 is an exploded view of the outsole of the shoe of FIGS. 8A-8B.
Figure 10A:
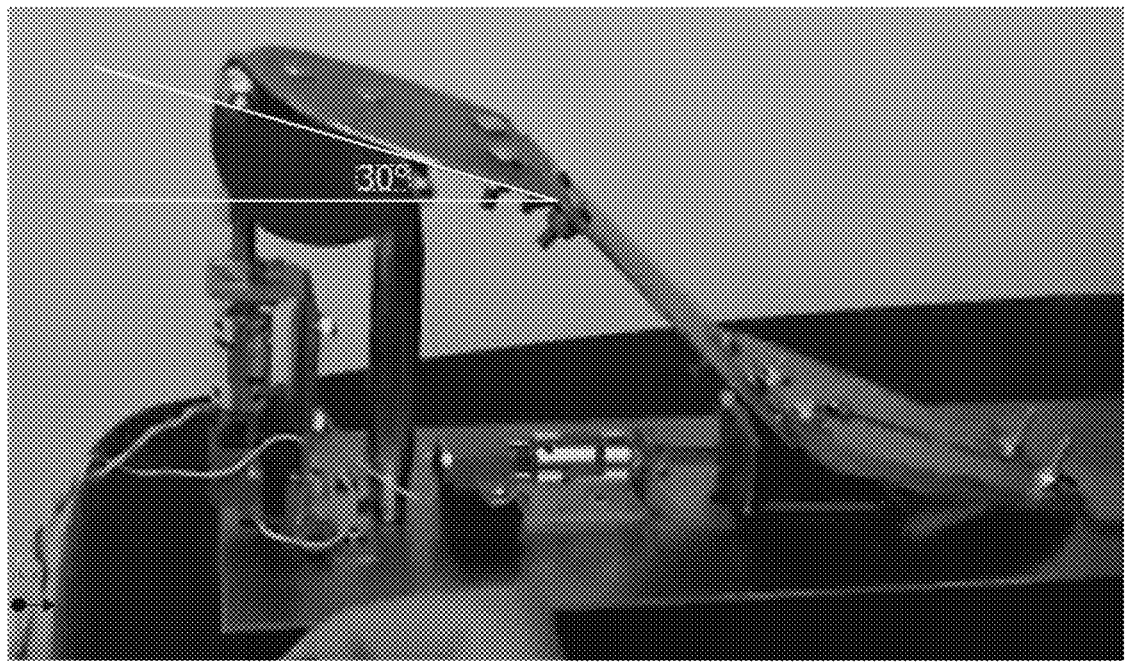
FIG. 10A is an orthogonal view of a prototype shoe according to another embodiment of the present disclosure, showing a 30° angle of the heel portion relative to the horizontal.
Figure 10B:
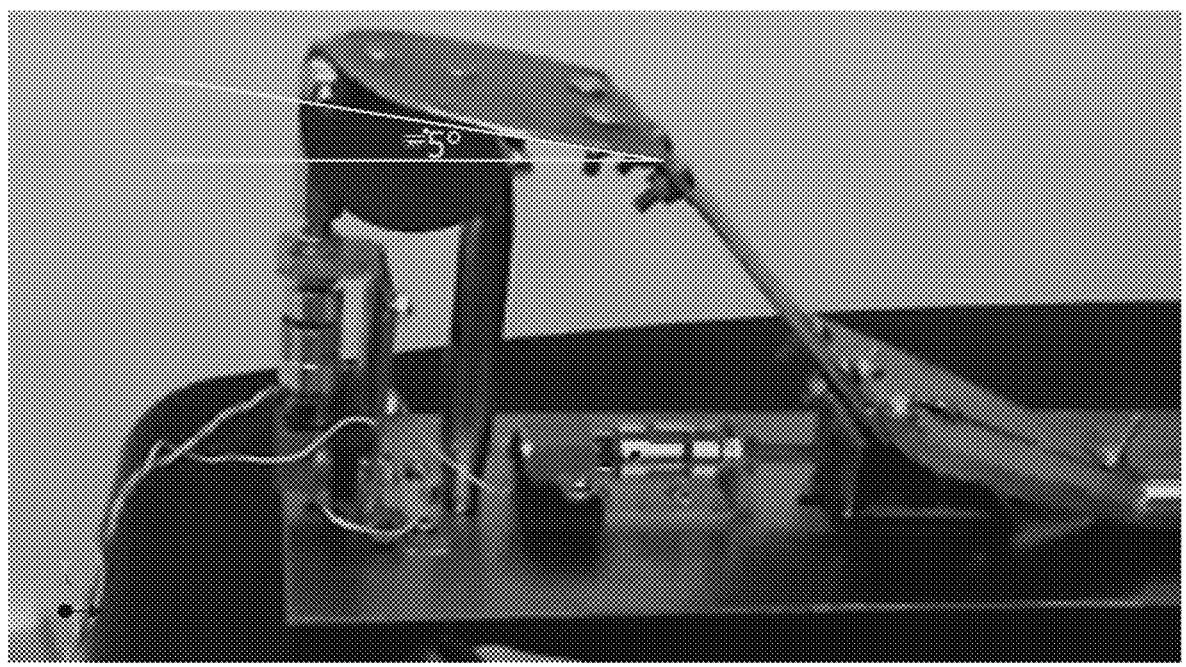
FIG. 10B is an orthogonal view of the prototype shoe of FIG. 10A, showing a 5° angle of the heel portion relative to the horizontal.
Figure 10C:
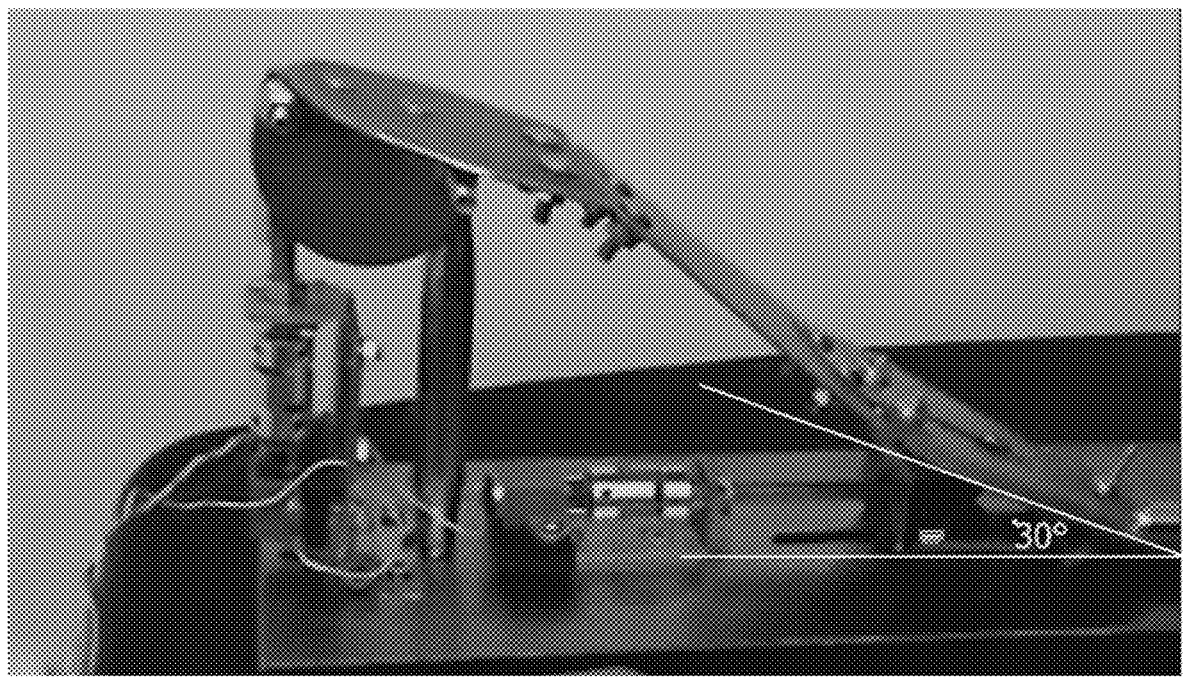
FIG. 10C is an orthogonal view of the prototype shoe of FIGS. 10A and 10B, showing a 30° angle of the forefoot portion relative to the horizontal.
Figure 10D:
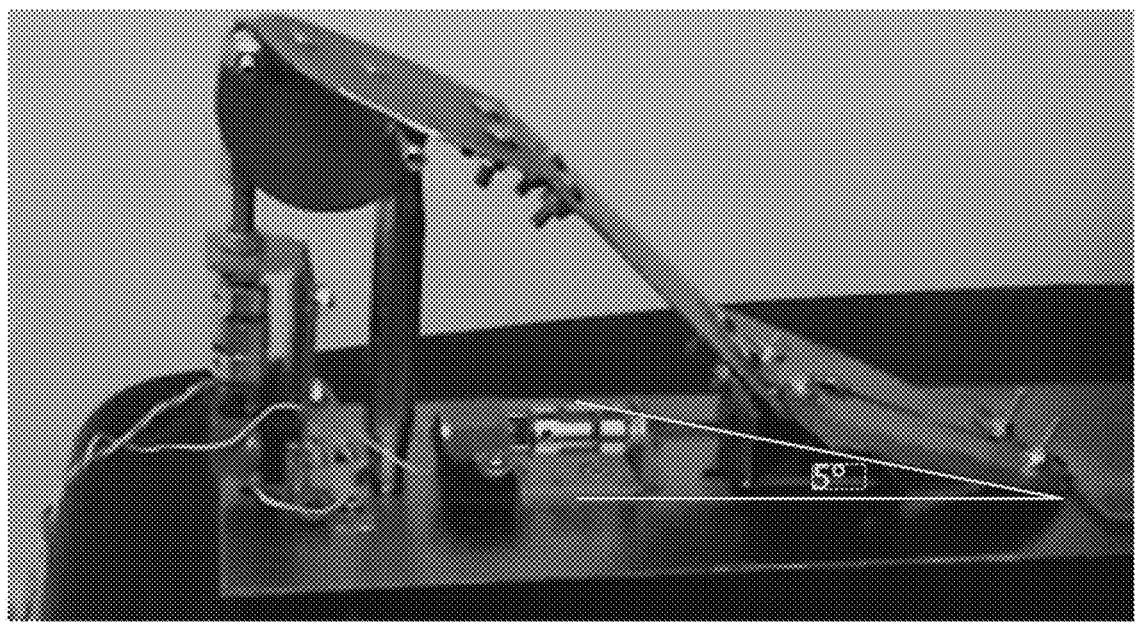
FIG. 10D is an orthogonal view of the prototype shoe of FIGS. 10A-10C, showing a 5° angle of the forefoot portion relative to the horizontal.
Figure 11:
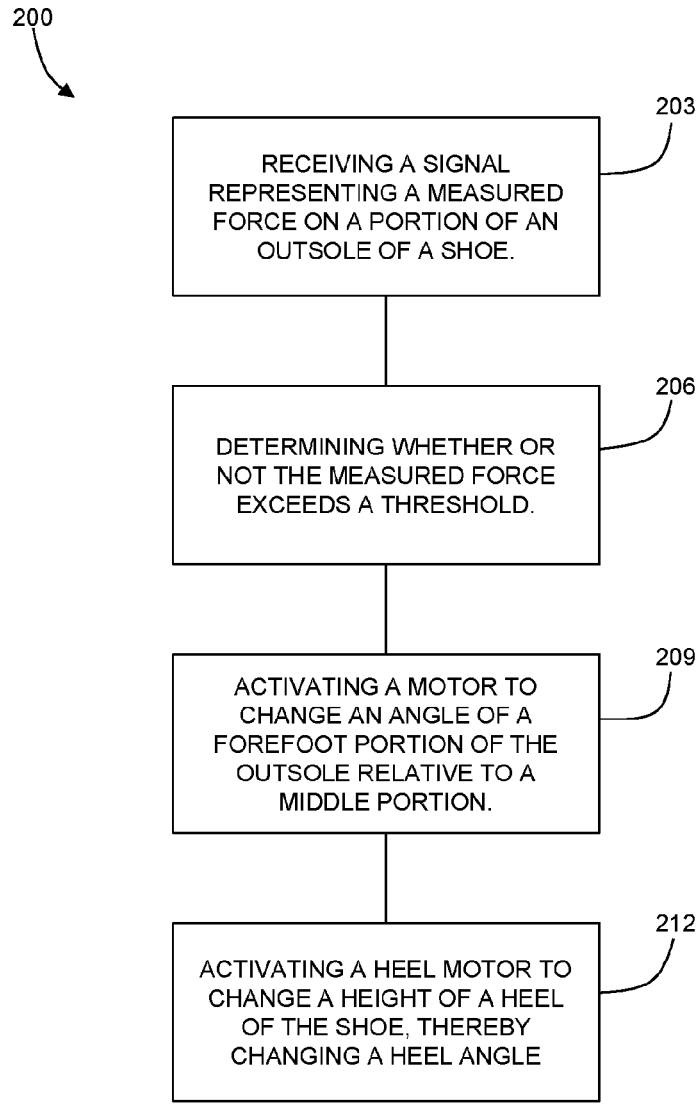
FIG. 11 is a chart depicting a method according to another embodiment of the present disclosure.

FIG. 6A illustrates the foot pressure of a subject wearing traditional high-heel shoes. High foot pressures can be seen at the forefoot of the subject. FIG. 6B illustrates the foot pressure of a subject wearing shoes according to an embodiment of the present disclosure. In FIG. 6B, low forefoot pressures can be seen, relative to the forefoot pressures apparent in FIG. 6A.

In the embodiment depicted in FIGS. 5A-5D, the heel portion 51 of the outsole includes a rotary table 54 in mechanical communication with a heel motor 56 by way of a shaft 55. In such an embodiment, the rotary table 54 can change the height of the heel so as to adjust the heel angle.

The forefoot portion 53 of the outsole includes a first motor 57 (i.e., a forefoot motor) and a driveshaft 58. In such an embodiment, the angle of the forefoot portion 53 can be adjusted by rotating the shaft 58 by way of the forefoot motor 57.

The shoes described herein can include an automatically rotating outsole and modular design high heel. These features can allow the shoes to have an adjustable heel height such that the shoes can interchange between high heel shoes or flat shoes depending on the user's preference or need. In one embodiment, the shoe can have an automatic rotating system, including one or more of the following components: (1) one or more motors including corresponding driveshaft(s); (2) a driveshaft including a plurality of gears (e.g., seven gears); (3) a driveshaft configured to adjust a rear sole section (heel) and a front sole portion (forefoot); (4) a microcontroller connected to one motor, one pressure sensor, one battery and one USB charger; (5) a sole including a plurality of cavities (e.g., six cavities). In one particular example, a first cavity can be used to house a motor; a second cavity can be used to house a front part of the drive shaft; a third cavity can be used to house the battery; a fourth cavity can be used to house the microcontroller; a fifth cavity can be used to house the USB charger; and a sixth cavity can be used to house a rear part of the driveshaft. In some embodiments cavities may be combined to house more than one component.

An automatic rotation mechanism for automatically rotating the outsole can be in controlled via a microcontroller. The microcontroller can be in communication with a sensor, such as a pressure sensor. When a user activates the sensor (e.g., the pressure sensor), the automatic rotating mechanism can be configured to move the shaft according to the information received from the sensor. The movement of the shaft can cause the rotation of the rear sole section (heel) and the front sole portion (forefoot). In this manner, a flat shoe can be converted to a high heel shoe by attaching the high heel bodily to the low heel.

In another aspect, the present disclosure may be embodied as a method 200 of adjusting a shoe. The method 200 comprising receiving 203, at a processor, a signal representing a measured force on a portion of an outsole of the shoe. For example, the signal may be received 203 from a sensor, such as pressure sensor. Such a sensor may be located at a position of the outsole to measure the force applied to at least a portion of the outsole. For example, the sensor may be located in a heel portion of the outsole to measure the force applied by the weight of a wearer at the heel of a shoe.

The method 200 includes determining 206 whether or not the measured force exceeds a pre-determined threshold. Where the measured force is determined 206 to exceed the threshold, a motor is activated 209 to change an angle of a forefoot portion of the outsole relative to a middle portion of the outsole. The motor may also change an angle of a heel portion of the outsole relative to the middle portion. In an embodiment, the method 200 further comprises activating 212 a heel motor to operate a rotary table, where the rotary table is configured to alter a heel height of the shoe. In this way, the angle of the heel portion relative to the middle portion is adjusted by the changing heel height. As such, the forefoot portion, the middle portion, and the heel portion are operable to change the state of the shoe between a high heel state and a low heel state. The low heel state may be a flat shoe state.

The components in the figures are not necessarily to scale, emphasis instead being placed upon illustrating the principles of the invention. Moreover, in the figures, like reference numerals designate corresponding parts throughout the different views.

Although the present disclosure has been described with respect to one or more particular embodiments, it will be understood that other embodiments of the present disclosure may be made without departing from the spirit and scope of the present disclosure. Hence, the present disclosure is deemed limited only by the appended claims and the reasonable interpretation thereof.

What is claimed is:

1. An adjustable shoe, comprising:
 an outsole having a middle portion hingedly attached to a forefoot portion at a forefoot angle, and the middle portion is also hingedly attached to a heel portion at a heel angle;
 a segmented driveshaft spanning from the forefoot portion of the outsole to the heel portion of the outsole, wherein rotation of a front segment of the driveshaft causes the forefoot portion of the outsole to rotate about the hinge axis thereby adjusting the forefoot angle;
 a first motor operable to rotate the driveshaft; and a processor in communication with the first motor, wherein the processor is programmed to operate the first motor to provide adjustment to the shoe.

2. The adjustable shoe of claim 1, wherein rotation of a rear segment of the driveshaft causes the heel portion of the outsole to rotate about the hinge axis thereby adjusting the heel angle.

3. The adjustable shoe of claim 1, wherein the heel portion includes a rotary table in communication with the processor, the rotary table being operable by a heel motor to adjust the heel angle.

4. The adjustable shoe of claim 1, further comprising a second motor operable to rotate a second driveshaft, wherein rotation of the second driveshaft causes the heel portion of the outsole to rotate about the hinge axis thereby adjusting the heel angle.

5. The adjustable shoe of claim 1, further comprising a first sensor in communication with the processor, the first sensor configured to measure a force applied to an area of the outsole; and wherein the processor is further programmed to adjust the forefoot angle and the heel angle according to a signal received from the first sensor.

6. The adjustable shoe of claim 5, wherein the first sensor is configured to measure a force exerted on at least a portion of the heel portion of the outsole.

7. The adjustable shoe of claim 6, further comprising a second sensor in communication with the processor, the second sensor configured to measure a force applied to at least a portion of the forefoot portion; and wherein the processor is further programmed to adjust the forefoot angle and the heel angle according to a signal received from the second sensor.

8. The adjustable shoe of claim 1, further comprising a heel configured to be removably attached to the heel portion of the outsole.

9. The adjustable shoe of claim 8, wherein the heel includes a coupler configured to attach to a mating coupler of the heel portion of the outsole.

10. The adjustable shoe of claim 1, further comprising a battery.

11. The adjustable shoe of claim 10, further comprising a charging circuit for charging the battery, the charging circuit configured to be connected to a power supply by a USB connection.

* * * * *